United States Patent

Klose

[15] 3,689,933

[45] Sept. 5, 1972

[54] APPARATUS EMPLOYED IN ELECTROSTATIC PRINTING

[72] Inventor: Peter H. Klose, Troy, Mich.

[73] Assignee: Energy Conversion Devices, Inc., Troy, Mich.

[22] Filed: Jan. 7, 1970

[21] Appl. No.: 1,264

[52] U.S. Cl. ..............................346/74 ES, 178/6.6 A

[51] Int. Cl. ..............................G01d 15/06, H04n 1/12

[58] Field of Search ..................346/74 ES; 178/6.6 A

[56] References Cited

UNITED STATES PATENTS

| | | | |
|---|---|---|---|
| 3,205,302 | 9/1965 | Quade | 178/6.6 A |
| 3,489,850 | 1/1970 | Adams et al. | 178/6.6 A |
| 3,530,441 | 9/1970 | Ovshinsky | 346/74 P |
| 3,395,401 | 7/1968 | Silverman | 346/74 ES |
| 2,955,894 | 10/1960 | Epstein | 346/74 |

*Primary Examiner*—Bernard Konick
*Assistant Examiner*—Gary M. Hoffman
*Attorney*—Edward G. Fiorito

[57] ABSTRACT

A rotating laser beam impinges on a ring of current controlling devices which couple a power supply to a row of slide wires. By modulating the laser beam certain devices conduct current from the power supply to the corresponding slide wires. The slide wires are mounted to make electrical contact with the dielectric surface of a rotating drum. Charge is deposited on the dielectric surface as a function of the amount of current conducted by the slide wires. The dielectric surface is developed by applying ink particles thereto. The particles are transferred to a document to produce an image corresponding to the pattern of charge deposited by the slide wires.

12 Claims, 7 Drawing Figures

PETER H. KLOSE
INVENTOR.

BY Edward G. Fiorito

ATTORNEY

PETER H. KLOSE
INVENTOR.

BY Edward G. Fiorito

ATTORNEY

APPARATUS EMPLOYED IN ELECTROSTATIC PRINTING

This invention may be employed in systems for converting data into a visible image, and more particularly in systems which convert a train of data pulses into an electrostatic image on a surface.

Data processing systems are capable of producing large amounts of information which must be converted into human readable form at a high rate of speed. Mechanical printers employing type heads shaped in the form of characters have speed limitations due to the inertia of the moving parts. Non-impact printers have been found to operate at higher speeds which are compatable with the requirements of data processing systems, and also facsimile transmission systems. The non-impact printer generally employs energy which may be focused in the form of a beam, and which is moved about and modulated in accordance with the data supplied to the non-impact printer. Frequently the beam is moved along a fixed path known as a raster scan similar to that developed in an ordinary television receiver. The data applied to the non-impact printer modulates the intensity of the beam as it traverses its fixed raster scan path. The beam may be applied to a specially sensitized paper or film which is developed to create a humanly observable image.

At the end of each scan line the beam ordinarily must fly back to the beginning of the next scan line, and during such fly back the intensity of the beam must be diminished or the speed at which it is moved must be so high that it will not produce a visible trace when paper or film is developed.

It is an object of the present invention to provide an improved apparatus for non-impact printing which is capable of high speed operation compatible with the requirements of data processing systems, and facsimile transmission systems.

The present invention employs an array of current controlling devices mounted in a circular loop. Each device exhibits a change in resistance upon the application of a beam of energy. The beam may be generated by a laser which is constantly rotating in a circular path impinging upon each device in a sequential manner once during each revolution. The beam is modulated by an optical shutter in response to data signals applied thereto. By synchronizing the rotation of the beam with the data signals applied to the modulator, selected devices in the ring can be made conductive or partially conductive in a precise, predetermined manner. A power supply is connected in common to all of the devices, while the other end of each device is connected to a slide wire. The slide wires are mounted in a row and positioned to make electrical contact with a dielectric surface.

In operation the present invention deposits charge on the dielectric surface in response to the selective activation of each device in the ring by the rotating beam. The dielectric may be moved continuously under the slide wires and a new row of charge deposited thereon each time the beam completes a revolution. No hesitation or discontinuity is required or observed between revolutions of the beam, or between each row of charge deposited by the slide wires.

Another advantage of the present invention is the ability to develop gray scale images by varying the amount of charge deposited on the dielectric surface in response to the current conducted by the array of current controlling devices.

The present invention takes advantage of batch fabricating techniques employed in integrated circuit manufacture. Suitable semiconductor materials for use in the current controlling devices are found in U.S. Pat. No. 3,271,591 granted Sept. 6, 1966 to Stanford R. Ovshinsky. Because of the amorphous or disordered structure of these materials, they may be deposited as thin films on a substrate. In this manner large numbers of devices can be formed on a substrate and connected to closely spaced slide wires to produce high resolution images. Such amorphous semiconductor materials have response times suitable for high speed printing operations and are economical in cost.

The above and other objects, advantages and features of this invention will become apparent to those skilled in the art upon reference to the accompanying specification, claims and drawings in which:

Figure 1:
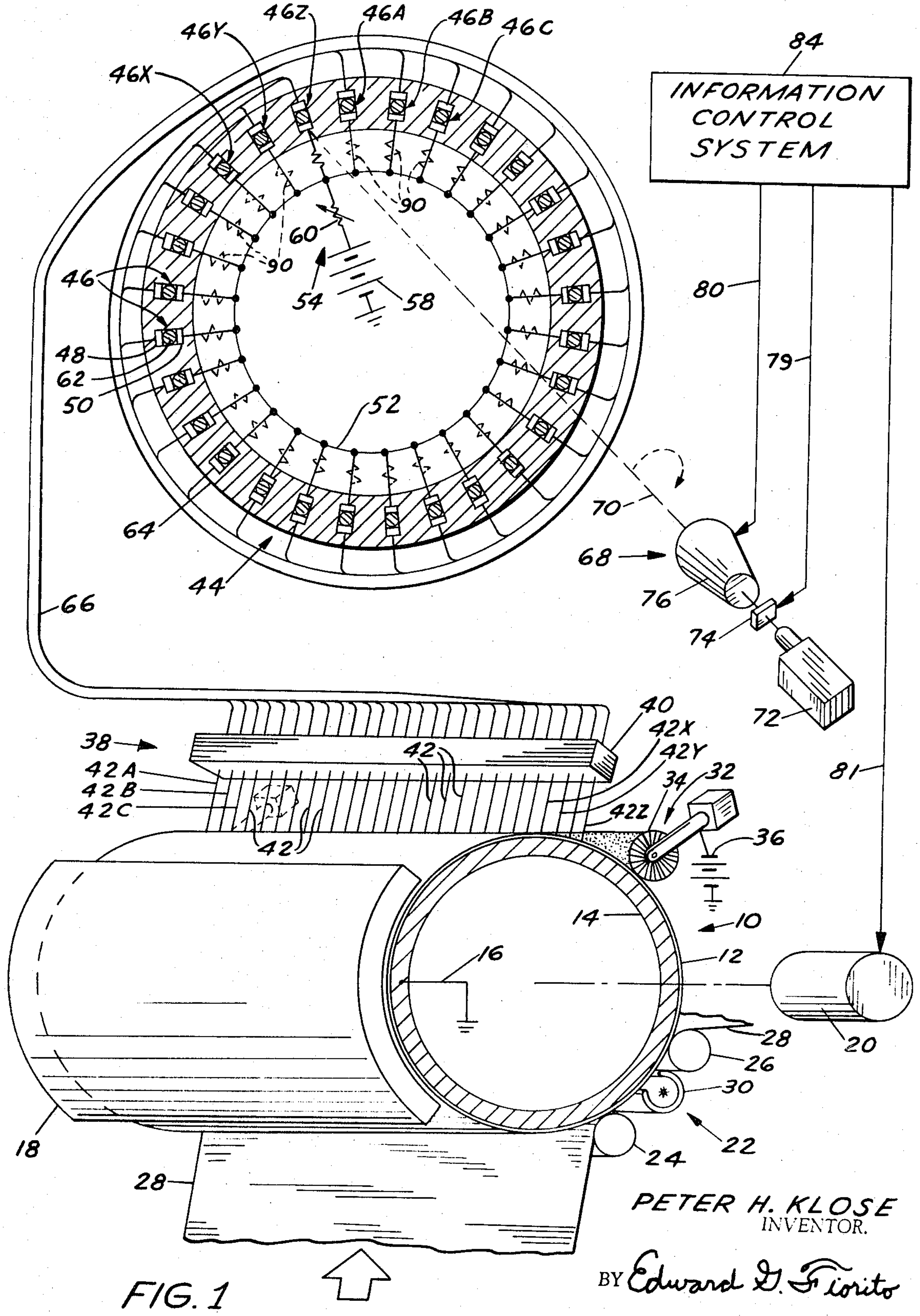
FIG. 1 is a diagrammatic representation of an electrostatic printer which converts a train of data pulses into an electrostatic image on a drum which is developed and transferred to a document.

The electrostatic printer shown in FIG. 1 employs a drum 10 having a dielectric coating 12 composed of a glassy or plastic material for example. The coating 12 is applied over a supporting structure 14 which has sufficient mechanical rigidity to withstand forces applied to the drum 10 during rotation thereof. The supporting structure 14 is composed of conductive materials such as aluminum, magnesium or steel and is connected to a ground 16.

A developing station 18 located on the periphery of drum 10 in FIG. 1 performs the function of dusting the dielectric surface 12 with ink particles. In accordance with the ordinary developing techniques employed in electrostatic printing, the ink particles applied to the dielectric surface 12 at developing station 19 cling to those regions of the dielectric surface 12 carrying a charge deposit. A motor 20 rotates the drum 10 so that the regions of surface 12 having ink particles clinging thereto pass from the developing station 18 to a printing station 22. A pair of rollers 24 and 26 place a document 28 in contact with the drum 10 at printing station 22. A corotron 30 assists in transferring the ink particles from the dielectric surface 12 to the paper 28 in a manner described in more detail in the text XEROGRAPHY AND RELATED PROCESSES, edited by J. Dessauer and H. Clark published by Focal Press Limited 1965. The particles of ink remaining on dielectric surface 12 after passing through printing station 22 are removed at a wiper station 32. A rotating brush 34 is charged to a negative potential by a battery 36 in order to remove the ink particles more effectively.

A charge pattern is deposited on the dielectric surface 12 at a write station 38. A mounting block 40 houses a row of slide wires 42. The wires 42 make sliding electrical contact with dielectric surface 12. When a current is applied to one of the slide wires 42 a charge develops on the dielectric surface 12 at a point where the slide wire 42 makes contact with the surface 12.

Current is applied to the slide wires 42 by an array 44 of current controlling devices 46. Each current controlling device 46 includes a pair of terminals 48 and 50 as shown in FIG. 1. All of the terminals 50 are connected in common by a conductor 52 to a power supply 54. The power supply 54 is composed of a battery 58 having its positive terminal connected in a series with a variable resistor 60 which couples current from the battery 58 to common connector 52.

Located between the terminals 48 and 50 of each current controlling device 46 is a body of amorphous semiconductor material 62. Suitable materials are glassy semiconductors such as those found in U.S. Pat. No. 3,461,296 entitled PHOTOCONDUCTIVE BISTABLE DEVICE by Stanford R. Ovshinsky, and may also be found in U.S. Pat. No. 3,271,591 entitled SYMMETRICAL CURRENT CONTROLLING DEVICE by Stanford R. Ovshinsky (referred to therein as Mechanism devices). These materials should be deposited in a thin layer and have sufficient length between terminals to exhibit a sufficiently high resistance to effectively block conduction when in the high resistance stable state. The semiconductor material 62 and terminals 48 and 50 are deposited as thin films on a ring shaped substrate 64. Since the amorphous semiconductor material 62 is a non-crystalline or highly disordered material, it may be deposited in a manner similar to the way in which conductors are deposited in the manufacture of integrated circuits. Accordingly a large number of current controlling devices 46 can be fabricated on the substrate 64. FIG. 1 illustrates a few current controlling devices 46 with wide separation therebetween. In fact exceedingly small current controlling devices 46 can be packed together with very little space therebetween resulting in as many as 1,500 current controlling devices 46 in a circular array 44 having a diameter of 3 inches.

Each terminal 48 of current controlling devices 46 is connected to a different one of the slide wires 42 by a cable connector 66. Adjacent slide wires 42 are connected to adjacent current controlling devices 46, except for the first slide wire designated 42A and the last slide wire designated 42Z which are not adjacent to one another, but are connected to adjacent current controlling devices designated 46A and 46Z, respectively.

A laser beam controller 68 applies a laser beam 70 to the semiconductor material 62 of each current controlling device 46 in a sequential manner. The beam as illustrated in FIG. 1 rotates clockwise, impinging upon each current controlling device 46 one after another, beginning a cycle with current controlling device 46A, and ending the cycle at current controlling device 46Z after making one complete revolution. Many suitable laser rotating devices may be employed in the present invention. One preferred form is shown in FIG. 1 where a laser beam source 72 generates laser beam 70. Source 72 may be a YAG or other high power laser of the appropriate wave length to be efficiently absorbed by the semiconductor 62. Laser beam 70 passes through an optical shutter 74 to a deflector 76. The optical shutter 74 may be a Pockel cell, or other suitable electro-optic device capable of selectively blocking or transmitting a portion or all of the energy in laser beam 70. The deflector 76 may be a rotating mirror, for example, capable of deflecting the laser beam 70 into a circular path, and may also include a lens system for focusing the laser beam 70 on the devices 46. Preferably the devices should be mounted in the focal plane of the laser beam 70 and in a plane perpendicular to the axes of rotation of the laser beam 70.

The source 72, optical shutter 74, deflector 76 and motor 20 are controlled by a group of lines 79–81 generated by an information control system 84. Information control system 84 performs the function of synchronizing the rotation of motor 20 and deflector 76, and provides a stream of data signals to optical shutter 74. Information control system 84 may generate the signals on line 79–81 from a data processing system or a facsimile transmission system. One suitable form of information control system 84 may be found in co-pending application Ser. No. 828,859 entitled HIGH SPEED PRINTER OF MULTIPLE COPIES FOR OUTPUT INFORMATION filed May 29, 1969 by Stanford R. Ovshinsky, Ronald G. Neale and Edgar J. Evans.

The current controlling devices 46 normally reside in their high resistance or blocking state. When a current controlling device 46 is in the blocking state, no current is coupled from power supply 54 to the corresponding slide wire 42 connected thereto. Each of the current controlling devices 46 can be made to conduct current therethrough by applying laser beam 70 to the semiconductor body 62 thereof. In one form of operation, the laser beam 70 is alternately blocked and unblocked by shutter 74 so that selected current controlling devices 46 shift from their blocking state to a conducting condition, thereby providing current to the corresponding slide wire 42 which in turn deposits a charge on dielectric surface 12. During one revolution of the laser beam 70 a charge pattern is deposited in a row on dielectric surface 12. During the deposition of a row of charge, motor 20 continuously rotates drum 10 so that at the beginning of the next writing cycle slide wire 42A is advanced to a new position on the dielectric surface 12 thereby establishing the starting point for a new row of charge. After a number of writing cycles during which drum 10 may advance 90° to 180°, a two dimensional matrix of selectively charged points is established on the surface 12 forming an electrostatic image of any desired symbolic, alpha-numeric or graphic information. As described above the electrostatic image is passed through developing station 18 and transferred to document 28 at printing station 22.

Figure 3A:
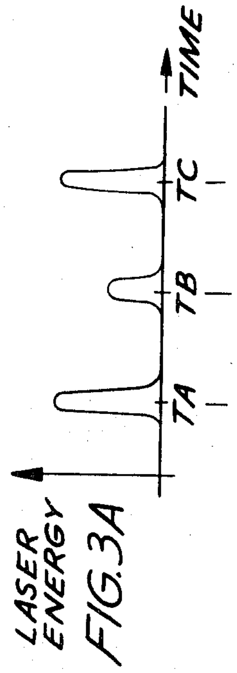
FIGS. 3A and 3B illustrate other waveforms developed in accordance with an alternate form of the present invention.
Figure 3B:
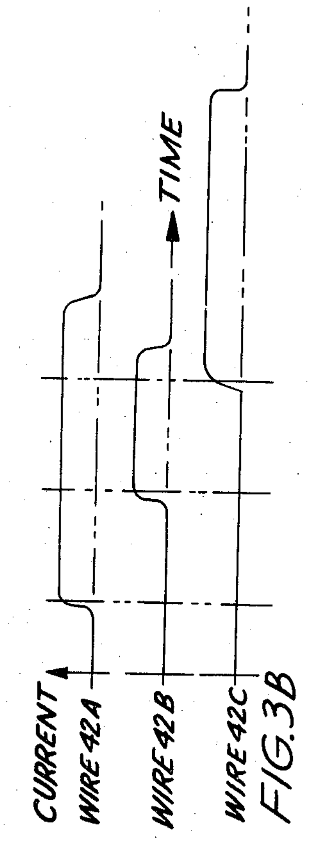
Figure 3C:
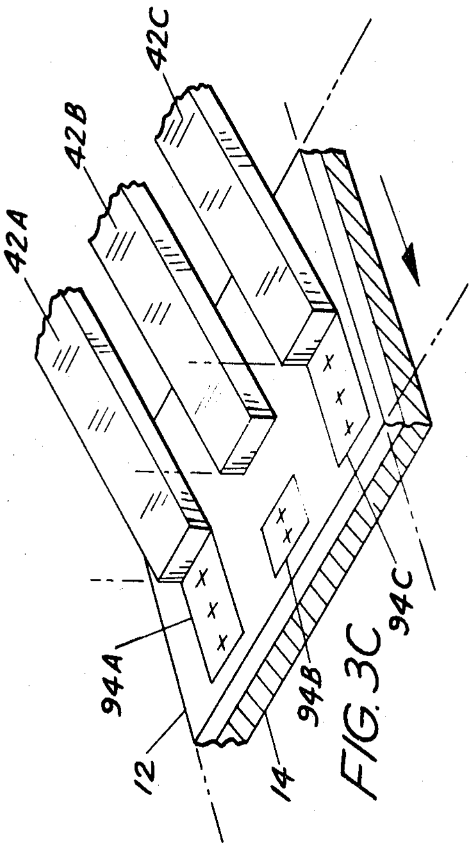
FIG. 3C is a diagram of a portion of the drum in FIG. 1, and illustrates the charge pattern traced on the surface of the drum in response to the laser energy and slide wire waveforms shown in FIGS. 3A and 3B.
Figure 2A:
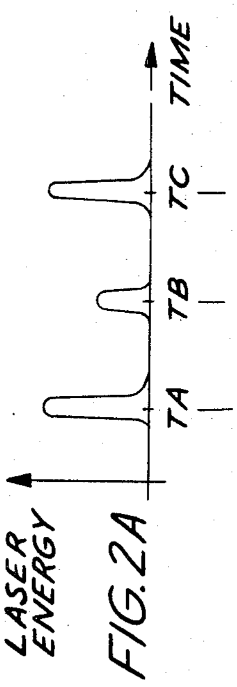
FIGS. 2A and 2B illustrate waveforms for a typical laser beam and corresponding slide wire current produced in accordance with the present invention.
Figure 2B:
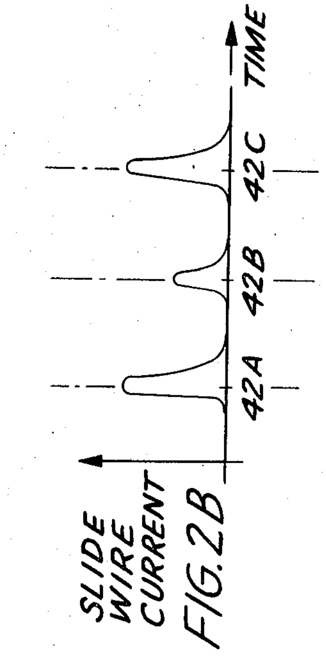
Figure 2C:
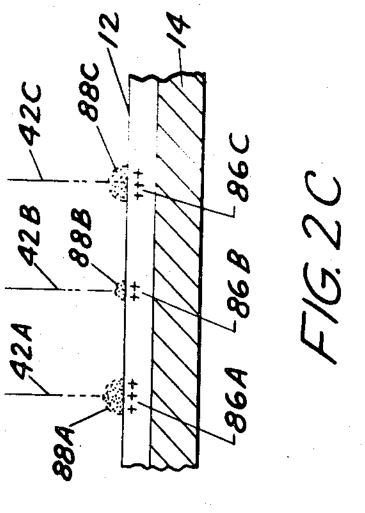
FIG. 2C is a diagram of a portion of the drum in FIG. 1 and illustrates the electrostatic image and ink particles formed as a result of the laser energy and slide wire current shown in FIGS. 2A and 2B.

The image produced by the foregoing operation of the present invention can be observed to be composed of a number of black dots of uniform size and dimension. Gray scale or shading can be achieved by selectively varying the spacing between black dots printed on the document 28. Another form of operation of the present invention can produce gray scale or shading, by varying the amount of charge deposited by slide wires 42 at each point on the dielectric surface 12. This may be accomplished by supplying slide wires 42 with a pulse of current of large amplitude, or a pulse of current having a wide pulse width, or a combination thereof. FIGS. 2A – 2C illustrate the variable pulse amplitude mode of operation for producing gray scale, and FIGS. 3A – 3C illustrate the variable pulse width mode of operation for producing gray scale. Like designations are applied to the same elements in FIGS. 1–3.

FIG. 2A is a graph wherein the energy of laser beam 70 is plotted along the ordinate, and time is plotted along the abscissa. Times TA, TB, and TC correspond to the time when laser beam 70 impinges on current controlling devices 46A, 46B and 46C, respectively. The pulse of laser energy at time TA is illustrated to be approximately twice as large as the pulse of energy at time TB, and approximately equal to the pulse of energy at time TC.

FIG. 2B is a graph wherein the current coupled to slide wires 42A, 42B and 42C is plotted against time. In this mode of operation the current pulse conducted by current controlling devices 46A – 46C approximately follows the shape of the energy pulse of laser beam 70, as illustrated in FIGS. 2A and 2B. This operation can be achieved by reducing the variable resistance 60 in FIG. 1 to a low value, or one approximately in the range of resistance of the current controlling devices 46 when they reside in the conducting or low resistance condition. In this manner the effective internal impedance of power supply 54 is relatively low, causing it to operate as a constant voltage source supplying an amount of current largely dependent upon the resistance of the current controlling devices 46.

FIG. 2C illustrates a resulting charge pattern 86A – 86C deposited on dielectric surface 12. After the charge pattern 86A – 86C is dusted with ink at developing station 18, mounds of ink 88A – 88C are formed over the charge pattern 86A – 86C. The amount of ink clinging to the charge deposited on surface 12 depends upon the quantity of charge at each point, as shown in FIG. 2C. Accordingly when the ink particles are transferred to document 28, the size of each spot printed thereon is dependent upon the amount of charge deposited on surface 12 which in turn is dependent upon the amount of laser energy in beam 70 impinging upon a corresponding one of the current controlling devices 46. In this manner gray scale or shading can be achieved by selectively varying the size of the spots printed on document 28.

Another mode of operation of the present invention capable of producing gray scale is illustrated in FIGS. 3A–3C. FIG. 3A is identical to FIG. 2A illustrating the same laser pulses applied to the same current controlling devices 46A – 46C. FIG. 3B illustrates the current waveforms on slide wires 42A – 42C resulting from the current produced by the laser pulses illustrated in FIG. 3A at times TA–TC, respectively. The current on slide wire 42A starts at time TA and continues until current controlling device 46A returns to its high resistance or blocking condition. The time interval during which current controlling device 46A conducts is dependent upon the amount of energy in laser beam 70 applied thereto at time TA. In a similar manner slide wire 42B begins conducting current at time TB, but terminates its conduction sooner than the conduction on slide wire 42A because current controlling device 46B started conducting in response to a smaller pulse of laser energy. Slide wire 42C begins conducting at time TC and ends after a time interval approximately the same as the interval of conduction on slide wire 42A.

The operation of the present invention in accordance with the waveforms shown in FIG. 3B can be achieved by reducing variable resistor 60 to a substantially zero value and placing a plurality of resistors 90 in series with current controlling devices 46, as shown in broken line in FIG. 1. The value of resistor 90 is larger than the resistance of the current controlling devices 46 when in their low resistance condition. By making these adjustments, the effective internal impedance of power supply 54 is high relative to each current controlling device 46, causing the power supply 54 to operate as a constant current source supplying each current controlling device 46 with a constant amount of current when the current controlling device 46 is in its conducting condition. For this mode of operation, the current controlling devices 46 need only be capable of shifting from a high resistance state to a low resistance condition, and need not have the ability to reside at various intermediary resistance conditions. Suitable semiconductor materials 62 which exhibit the characteristic operation illustrated in FIG. 3B are high resistivity unistable materials such as $Se_{93}S_7$ or $Se_{93}As_3Te_2$.

FIG. 3C illustrates a group of charge patterns 94A – 94C deposited on surface 12 when slide wires 42A – 42C conduct current in accordance with the waveforms shown in FIG. 3B. The slide wires 42A – 42C are illustrated in FIG. 3C to be rectangular in cross section. This cross section is suitable for this mode of operation of the present invention. The width of each charge pattern 94A – 94C is the same, but the length thereof is proportional to the length of the pulse widths illustrated in FIG. 3B. Accordingly, after passing through developing station 18 and printing station 22 the image printed on document 28 consists of a group of black strokes having varying lengths. Upon viewing a large number of such strokes closely spaced together in a matrix, light gray or slight shading is observed where the short stroke charge patterns are located, and dark gray or heavy shading is observed where the long charge patterns are located.

The slide wires 42 in FIG. 1 are arranged in a row perpendicular to the direction of rotation of the drum 10. It may be preferable in some application of the present invention to rotate block 40 to another angle. This would reduce the space between adjacent tracks on dielectric surface 12 formed by slide wires 42. Additional slide wires would have to be added to writing station 38 in order to extend the row of slide wires 42 completely across the drum 10 when the block 40 is skewed.

A straight line row of slide wires 42 is illustrated in FIG. 1. In some applications, the row may have a bow, curve, or other deviation from a straight line path. The row of slide wires 42 may be arranged along any path, so long as the data supplied by information control system 84 compensates for the deviation from a straight line path. This compensation may be accomplished, for example, by taking data samples from the source document using a scanning sampler which follows the same path as the geometry selected for the row of slide wires 42.

Another modification may be made to the specific embodiment of the present invention as shown in FIG. 1 by varying the shape of the array 44 of current controlling devices 46. For example an elliptical array 44 may be fabricated in accordance with the present invention and a corresponding adjustment to deflector 76 may be made causing the laser beam 70 to traverse an elliptical path. Any closed loop path may be established to obtain the advantages of the present invention, including the elimination of any fly back requirement for the beam 70.

Still another modification may be made to the present invention by eliminating the drum 10, and placing the document 28 directly in contact with slide wires 42. In this embodiment of the present invention document 28 exhibits a charge sensitive, or storing characteristic and may be developed directly by dusting with ink particles which may be in the form of a wet toner. Dielectric material 12 may also be replaced with a semiconductor coating such as that described in application Ser. No. 1,265, filed on even date herewith and entitled "METHOD AND APPARATUS FOR ELECTROSTATIC PRINTING" by Peter H. Klose and Stanford R. Ovshinsky. In this embodiment of the present invention a potential source is connected to a conductive support 14 and slide wires 42 perform the function of lowering the resistance of semiconductor coating 12, whereby charge from support 14 is passed through the coating 12 to the surface. Developing and printing is accomplished in the same manner at stations 18 and 22 respectively.

While a laser beam 70 is employed in the electrostatic printer shown in FIG. 1, other forms of energy can be utilized, such as an electron beam. Appropriate changes in the composition of semiconductor material 62 would normally accompany such a modification.

Numerous other modifications may be made to various forms of the invention described above without departing from the spirit and scope of the present invention.

What is claimed is:

1. Apparatus for depositing a pattern of charge on a surface comprising:

a plurality of slide wires arranged sequentially in a row and mounted to make sliding electrical contact with said surface;

a plurality of current controlling devices comprising an amorphous semiconductor material, which is capable of varying its resistance under the effect of energy applied thereto, said devices being mounted sequentially in a closed loop;

a plurality of conductors connecting each slide wire to a different one of said current controlling devices, adjacent wires in said row being connected to adjacent devices in said loop, except for the first wire in said row and the last wire in said row which are not adjacent to one another but are connected to adjacent devices in said loop;

a continuously moving beam of energy sequentially impinging upon each of said devices in said loop; and modulator means located in the path of said beam of energy for modulating the intensity of said beam to vary the resistance of each device, whereby a pattern of charge is deposited by said slide wires on said surface.

2. Apparatus as defined in claim 1 wherein said beam of energy is a laser beam.

3. Apparatus as defined in claim 1 wherein each of said current controlling devices is a two terminal device having a first terminal and a second terminal, each of said first terminals being connected to a different one of said conductors, further characterized by the addition of:

a power supply; and a common conductor connecting all of said second terminals of said current controlling devices to said power supply whereby current from said power supply is variably coupled through said current controlling devices to said slide wires.

4. Apparatus as defined in claim 3 wherein each of said current controlling devices resides in a stable high resistance condition in the absence of the application of said beam of energy, and exhibits a low resistance condition that varies as a function of the intensity of said beam of energy applied thereto, whereby the amount of current conducted through said slide wires varies as a function of the intensity of the energy of said beam.

5. Apparatus as defined in claim 3 wherein each of said current controlling devices resides in a stable high resistance state in the absence of the application of said beam of energy, and shifts to a low resistance condition upon the application of said beam of energy, and remains in said low resistance condition for a period of time dependent upon the intensity of said beam of energy applied thereto, whereby the accumulation of charge deposited on said surface by each of said slide wires varies as a function of the period of time during which the corresponding current controlling device connected thereto remains in its low resistance condition.

6. Apparatus as defined in claim 1 further characterized by the addition of drive means for moving said slide wires and surface relative to one another whereby a plurality of rows of charge patterns are deposited on said surface.

7. Apparatus as defined in claim 6 further characterized by the addition of control means connected to said drive means and modulator means for synchronizing the relative motion of said surface and wires with the modulation of said beam of energy.

8. An electrostatic printer comprising a surface capable of storing an electrical charge applied thereto:

a plurality of current controlling devices each having a first terminal and a second terminal and comprising an amorphous semiconductor and exhibiting a variable resistance therebetween which changes as a function of energy applied thereto, said devices being mounted sequentially in a circular loop;

a power supply connected in common to the first terminal of all of said current controlling devices;

a plurality of slide wires arranged sequentially in a row and mounted to make sliding electrical contact with said surface to deposit charges thereon;

a plurality of conductors connecting each slide wire to a different one of said current controlling devices, adjacent wires in said row being connected to adjacent devices in said loop except for the first wire in said row and the last wire in said row which are not adjacent to one another but are connected to adjacent devices in said loop;

a continuously circulating beam of energy sequentially impinging upon each of said devices in said loop;

modulator means located in the path of said beam of energy for modulating the intensity of said beam to vary the resistance of each device; and developing means for applying ink particles to said surface which cling to those points on said surface upon which charge is deposited by said slide wires.

9. Apparatus as defined in claim 8 wherein each of said current controlling devices resides in a stable high resistance condition in the absence of the application of said beam of energy and exhibits a low resistance condition that varies as a function of the intensity of said beam of energy applied thereto, and wherein said power supply means has a low internal impedance in the range of said low resistance condition whereby the amount of current conducted through each slide wire varies as a function of the intensity of the energy of said beam applied to the corresponding one of said current devices connected thereto.

10. Apparatus as defined in claim 8 wherein each of said current controlling devices resides in a stable high resistance state in the absence of the application of said beam of energy, and shifts to a low resistance condition upon the application of said beam of energy remaining in said low resistance condition for a period of time dependent upon the intensity of said beam of energy applied thereto, and wherein the internal impedance of said power supply is higher than said low resistance, whereby the accumulation of charge deposited on said surface by each of said slide wires varies as a function of the period of time during which the corresponding current controlling device connected thereto remains in its low resistance condition.

11. Apparatus as defined in claim 8 wherein said surface is shaped in the form of a drum having an outer surface composed of a dielectric material, further characterized by the addition of:

drive means for rotating said drum to cause said dielectric surface to move under said slide wires; and printing means for placing a document in contact with said drum and transferring at least a portion of said ink particles to said document, forming a copy of the charge pattern deposited by said slide wires.

12. Apparatus as defined in claim 8 wherein said beam of energy is a laser beam.

* * * * *